United States Patent
Noronha et al.

(10) Patent No.: US 8,727,729 B2
(45) Date of Patent: May 20, 2014

(54) METHOD FOR PRODUCING A SHROUDED IMPELLER FROM TWO OR MORE COMPONENTS

(75) Inventors: Marian B. Noronha, Madbury, NH (US); Timothy P. Noronha, Dover, NH (US)

(73) Assignee: Turbocam, Inc., Barrington, NH (US)

( * ) Notice: Subject to any disclaimer, the term of this patent is extended or adjusted under 35 U.S.C. 154(b) by 567 days.

(21) Appl. No.: 12/825,381

(22) Filed: Jun. 29, 2010

(65) Prior Publication Data

US 2011/0318183 A1 Dec. 29, 2011

(51) Int. Cl.
*F04D 29/22* (2006.01)

(52) U.S. Cl.
USPC ..................................... 416/186 R

(58) Field of Classification Search
USPC ............... 415/206; 416/178, 182, 183, 185, 416/186 R, 187, 188; 29/889.2, 889.21
See application file for complete search history.

(56) References Cited

U.S. PATENT DOCUMENTS

| | | | |
|---|---|---|---|
| 2,625,365 A | | 1/1953 | Moore |
| 3,159,106 A | | 12/1964 | Schumbacker et al. |
| 3,224,079 A | * | 12/1965 | Dybvig ........................ 29/889.4 |
| 5,445,215 A | | 8/1995 | Herbert |
| 5,989,664 A | * | 11/1999 | Takayama et al. ........... 428/36.1 |
| 6,081,423 A | * | 6/2000 | Griffin .......................... 361/688 |
| 6,276,899 B1 | * | 8/2001 | Lambert et al. ........... 416/186 R |
| 6,280,493 B1 | | 8/2001 | Eubank |
| 6,474,938 B2 | | 11/2002 | Dalton |
| 7,281,675 B2 | | 10/2007 | Elrod |
| 7,371,139 B1 | | 5/2008 | Abella |
| 8,534,992 B2 | | 9/2013 | Presz, Jr. |
| 2005/0071998 A1 | | 4/2005 | Rocky |
| 2005/0163614 A1 | * | 7/2005 | Chapman ....................... 415/206 |
| 2007/0147999 A1 | | 6/2007 | Feher |
| 2007/0163114 A1 | | 7/2007 | Johnson |
| 2010/0111698 A1 | * | 5/2010 | Wiedeman et al. ........... 416/189 |
| 2012/0141261 A1 | * | 6/2012 | Giovannetti et al. ......... 415/203 |

FOREIGN PATENT DOCUMENTS

| | | |
|---|---|---|
| EP | 1533528 A2 | 5/2005 |
| FR | 2351289 A1 | 12/1977 |
| JP | 59068599 A | 4/1984 |
| JP | 2009024571 A | 2/2009 |
| WO | 2006133363 A2 | 12/2006 |

* cited by examiner

*Primary Examiner* — Edward Look
*Assistant Examiner* — Liam McDowell
(74) *Attorney, Agent, or Firm* — Peter Nieves; Sheehan Phinney Bass + Green PA (57) ABSTRACT

Provided is a two-piece shrouded impeller, and methods for manufacturing and assembling a two-piece shrouded impeller. The two-piece shrouded impeller, in accordance with one embodiment, may have a one-piece partially shrouded impeller having a central hub, a number of blades integrally attached to the hub, and one or more integral partial shroud sections integrally attached to the blades. The two-piece shrouded impeller in this embodiment may also have a separate shroud section that attaches to the one-piece shrouded impeller, so that the separate shroud section and the partial shroud sections combine to form a completed shroud that covers the impeller blades. The separate shroud section may attach to the one-piece shrouded impeller with a snap joint, or with an interference fit, or using a squeeze deformable ring. Once attached, the shroud section may be bonded to the one-piece shrouded impeller by brazing, stick welding, ultrasonic welding, or electron beam welding.

23 Claims, 11 Drawing Sheets

METHOD FOR PRODUCING A SHROUDED IMPELLER FROM TWO OR MORE COMPONENTS

FIELD OF THE INVENTION

The present invention is generally related to a method for producing turbomachinery parts and more particularly is related to a method of producing shrouded impellers.

BACKGROUND

Impellers are widely used to move fluids and/or extract energy from them. Example applications include aircraft and water craft propulsion systems, power generation, turbocharging, gas compression, air separation and refrigeration.

Impellers may be classified as open, where the impeller blades rotate next to a fixed conduit surface, or enclosed (or "shrouded"), where an enclosing shroud is affixed to the blades and rotates with the impeller. Fluid flowing through the internal passages of a shrouded impeller interacts less with stationary conduit walls than in an open impeller. The relative velocity between the shrouded impeller and the contained fluid at any given radius may be small compared to an open impeller, resulting in less frictional phenomena, such as wear or pressure loss.

A shrouded impeller may be an integral, or one-piece unit, manufactured from one solid piece of material or it may instead be constructed from two or more components, which are attached together to form the finished product. In the latter case, the separate parts most commonly include a bladed hub and a separate shroud. The main advantage of a one-piece shrouded impeller is that it lacks seams where multiple pieces would otherwise be attached. Such seams initiate cracking, and may also interfere with the flow of fluid through the impeller. However, manufacturing a one-piece impeller may be more expensive and time consuming than manufacturing and assembling an impeller from multiple components. Manufacturing and assembling a shrouded impeller from two or more pieces may allow the use of shorter tools. Shorter tools may suffer less wear than longer reach tools, since they experience less deflection and vibration while machining and cutting, resulting in better dimensional accuracy and surface finish.

There is therefore an unaddressed need in the industry for a process of manufacturing shrouded impellers in two or more pieces that approach the strength and performance of a one-piece shrouded impeller.

SUMMARY

Accordingly, a first aspect of the present invention is a first method for manufacturing a shrouded impeller. This first method includes a step of forming a one-piece partially shrouded impeller comprising a central hub with a bore, and a plurality of blades integrally attached to the hub. The one-piece partially shrouded impeller has a partial shroud integrally attached to the blades, including an inner integral shroud and an outer integral shroud. The radius of the inner edge of the outer integral shroud is larger than the radius of the outer rim of the inner integral shroud, thereby leaving an annular gap between the inner integral shroud and the outer integral shroud. The first method also includes the step of forming an annular shroud section with an inner surface, an inner edge with a radius approximately equal to the inner integral shroud outer rim radius, and an outer rim with a radius approximately equal to the outer integral shroud inner edge radius. The shrouded impeller may also have a plurality of blade axial extensions, and a plurality of grooves formed in the inner surface of the annular shroud section configured to receive the blade axial extensions. Forming the one-piece partially shrouded impeller and forming the annular shroud section may be done by, but not limited to, milling, selective laser sintering (SLS), or stereolithography. The methods of bonding may include, but not limited to, brazing, stick welding, ultrasonic welding, or electron beam welding.

A second aspect of the present invention is a method for assembling a shrouded impeller, including providing a partially shrouded impeller having a centrally located hub, a plurality of blades, and an integral shroud section. The method for assembling the impeller also includes providing a separate shroud section, attaching the partial shroud section to the partially shrouded impeller, and bonding the annular shroud section to the partially shrouded impeller. The method of attaching may involve, but not limited to, a snap joint, an interference fit, or a squeeze-deformable ring. The methods of bonding may include, but not limited to, brazing, stick welding, ultrasonic welding, or electron beam welding.

A third aspect of the present invention is a shrouded impeller apparatus, including a one-piece partially shrouded impeller having a centrally located hub with a center bore, a plurality of blades integrally attached to the hub, an inner integral shroud attached to the blades, and an outer integral shroud integrally attached to the blades. The shrouded impeller apparatus also includes an annular shroud section having an inner surface adjacent to the blades, an inner edge adjacent to the inner integral shroud outer rim, and an outer rim adjacent to the outer integral shroud inner edge. The area of the annular shroud section may range from 10% to 90% of the area of the shroud comprising the annular shroud section, the inner integral shroud, and the outer integral shroud. The shrouded impeller may also have a plurality of blade axial extensions, and a plurality of grooves formed in the inner surface of the annular shroud section configured to receive the blade axial extensions.

A fourth aspect of the present invention is a second method for manufacturing a shrouded impeller. This second method includes forming a one-piece partially shrouded impeller. The one-piece partially shrouded impeller includes a centrally located hub formed with a center bore, a plurality of blades integrally attached to the hub, and an integral partial shroud integrally attached to the blades. The integral partial shroud includes an outer rim and an inner edge, where the inner edge radius is smaller than the radius of the integral partial shroud outer rim. The shrouded impeller may also have a plurality of blade axial extensions. The second method also includes the step of forming a shroud section. The shroud section has an inner surface, with grooves formed in the inner surface to receive the blades. The shroud section also has a connecting edge and a free edge. The radius of the shroud section connecting edge may be approximately equal to the integral partial shroud inner edge radius, with the shroud section free edge radius smaller than the shroud section connecting edge radius. Alternatively, the radius of the shroud section connecting edge may be approximately equal to the integral partial shroud outer rim radius and with the shroud section free edge radius larger than the shroud section connecting edge radius. The methods of bonding may include, but not limited to, brazing, stick welding, ultrasonic welding, or electron beam welding.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principals of the invention.

DETAILED DESCRIPTION

The present invention provides a shrouded impeller, and methods for manufacturing a shrouded impeller. Reference will now be made in detail to the present preferred embodiments of the present invention, examples of which are illustrated in the accompanying drawings. Wherever possible, the same reference numbers are used in the drawings and the description to refer to the same or like parts.

The figures depict three general embodiments of a two-piece shrouded impeller: two embodiments where an impeller hub and blades are integrally connected to a single integral partial shroud section and one embodiment where an impeller hub and blades are integrally connected to a partial shroud divided into inner and outer sections. In each embodiment of the two-piece shrouded impeller, a separate partial shroud section is manufactured and later attached to the integrated hub, blades and partial shroud to form an assembled shrouded impeller. The figures also show one embodiment of a three-piece shrouded impeller.

Figure 1:
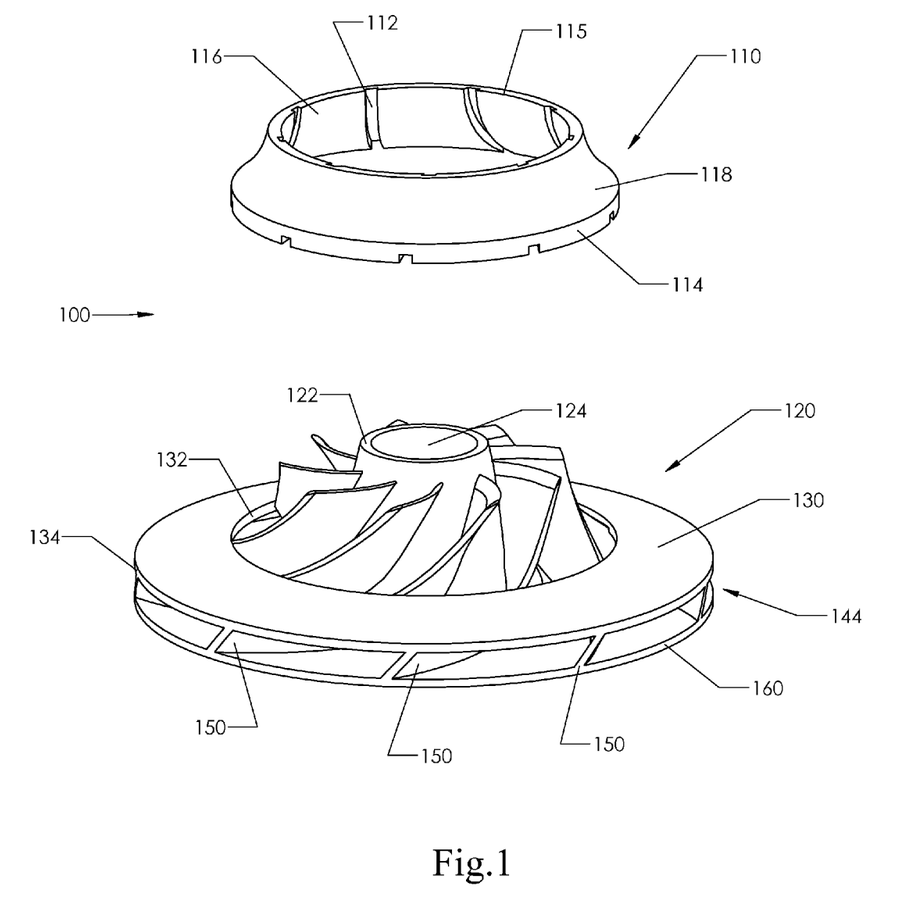
FIG. 1 is a diagram of a first embodiment of a two-piece shrouded impeller in exploded form.

FIG. 1 depicts an exploded view of a first embodiment of a two-piece shrouded impeller 100. The first piece of the two-piece shrouded impeller 100 is a one-piece open center partially shrouded impeller 120. The second piece of the two-piece shrouded impeller 100 is a center ring shroud 110. The one-piece open center partially shrouded impeller 120 has a hub 122, an integral partial shroud 130, and a plurality of blades 150. The hub 122 is formed around a bore 124, allowing the hub 122 to be attached to a shaft (not shown) passing through the bore 124. The plurality of blades 150 are integrally attached to the hub 122 and are also integrally attached to the integral partial shroud 130. The integral partial shroud 130 partially covers the plurality of blades 150 under a partial shroud surface spanning from an inner edge 132 of integral partial shroud 130 to an outer rim 134 of integral partial shroud 130.

The center annulus shroud 110 is manufactured separately from the one-piece open center partially shrouded impeller 120. The center annulus shroud 110 attaches to the one-piece open center partially shrouded impeller 120, further enclosing the plurality of blades 150. In this first embodiment, a plurality of grooves 112 is formed into an inner surface 116 of the center annulus shroud 110. The plurality of grooves 112 correspond to the plurality of blades 150, so that the plurality of blades 150 fit into the plurality of grooves 112 when the center annulus shroud 110 and the one-piece open center partially shrouded impeller 120 are assembled. When assembled, an outer rim 114 of the center annulus shroud 110 is adjacent to an inner edge 132 of integral partial shroud 130, forming a seam 190 as shown in FIG. 2.

Figure 2:
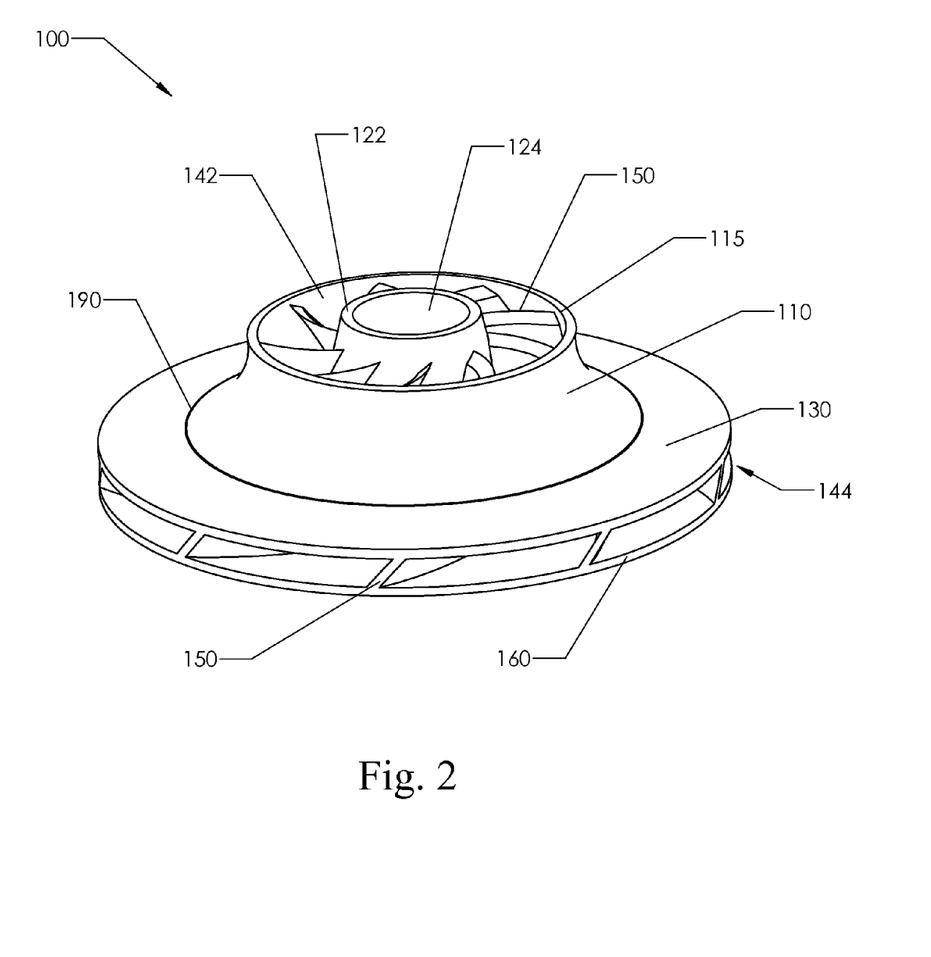
FIG. 2 is a second view of the first embodiment of the two-piece shrouded impeller as assembled.

FIG. 2 depicts a second view of the first embodiment of the two-piece shrouded impeller 100 where the center annulus shroud 110 and the one-piece open center partially shrouded impeller 120 are assembled. When assembled, the two-piece shrouded impeller 100 rotates around a shaft (not shown) passing through the bore 124. Fluid enters the two-piece shrouded impeller 100 through an inlet 142, is impelled by the plurality of blades 150, passing between the hub 122 and the center annulus shroud 110 and the integral partial shroud 130, and exits through an outlet 144. The outlet 144 is formed and bounded by the integral partial shroud 130, the plurality of blades 150, and a floor 160.

While the first embodiment of the two-piece shrouded impeller 100 provides several manufacturing advantages over a one-piece shrouded impeller mentioned previously, there are fabrication constraints because the first embodiment of the two-piece shrouded impeller 100 provides just two general areas for attaching the center ring shroud 110 to the one-piece partially shrouded impeller 120: first at the seam 190 where center annulus shroud outer rim 114 (FIG. 1) abuts the inner edge 132 (FIG. 1) of integral partial shroud 130 (FIG. 1) and second, where the plurality of blades 150 insert into the plurality of grooves 112 (FIG. 1). In particular, the inner edge 115 (FIG. 1) of center annulus shroud 110 is not attached to the one-piece open center partially shrouded impeller 120.

Figure 3:
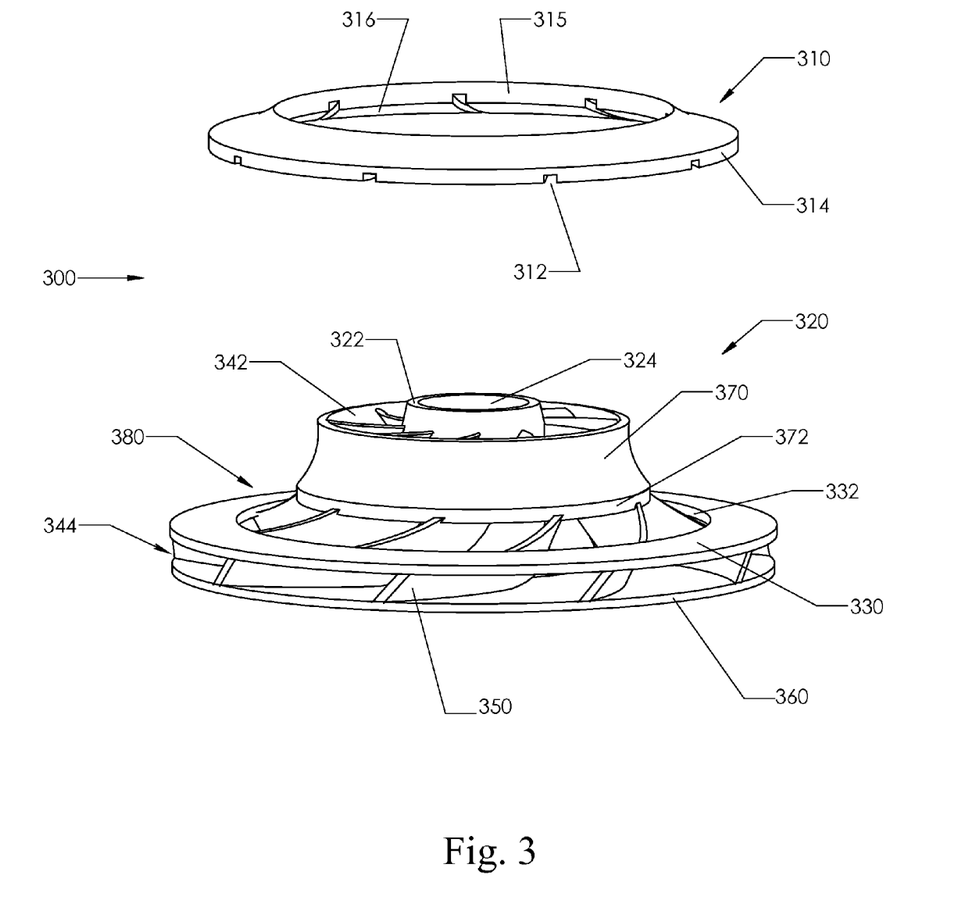
FIG. 3 shows a second embodiment of a two-piece shrouded impeller in exploded form.

FIG. 3 depicts a second embodiment of a two-piece shrouded impeller 300 that addresses the issue discussed above. In this second embodiment, the first piece of the two-piece shrouded impeller 300 is a one-piece partially shrouded impeller 320. The one-piece partially shrouded impeller 320 has two integral shroud sections: an outer integral shroud 330 and an inner integral shroud 370. The outer integral shroud 330 and the inner integral shroud 370 do not meet, but instead leave an open gap between them. The gap between outer integral shroud 330 and inner integral shroud 370 forms an annulus 380.

The one-piece partially shrouded impeller 320 has an integrally machined hub 322 and a plurality of blades 350. The hub 322 is formed around a bore 324, allowing the hub 322 to be attached to a shaft (not shown) passing through the bore 324. The plurality of blades 350 are integrally attached to the hub 322 and are also integrally attached to the outer integral shroud 330 and to the inner integral shroud 370.

The second piece of the two-piece shrouded impeller 300 is an annular shroud section 310. FIG. 3 shows an exploded view of the two-piece shrouded impeller 300 with the one-piece partially shrouded impeller 320 separate from the annular shroud section 310. When assembled, an annular shroud section rim 314 is adjacent to an outer integral shroud inner edge 332. Similarly, when assembled, an annular shroud section inner edge 315 is adjacent to an inner integral shroud rim 372. The manner in which the annular shroud section 310 attaches to a plurality of blades 350 is discussed below.

After the two-piece shrouded impeller 300 has been assembled, the assembled shroud includes the inner integral shroud 370, the annular shroud section 310 and the outer integral shroud section 330. In the second embodiment, the annular shroud section 310 represents approximately 25% of the completed shroud area. In alternative embodiments, the area of the annular shroud section 310 may represent a percentage of the assembled shroud area ranging from 10% to 90% of the assembled shroud.

As discussed above regarding the first embodiment, when assembled, the two-piece shrouded impeller 300 rotates about a shaft (not shown) which passes through a bore 324. Fluid enters the two-piece shrouded impeller 300 through an inlet 342, is impelled by the plurality of blades 350, flowing between the hub 322 and the inner integral shroud 370, the annular shroud section 310 and the outer integral shroud 330, and is expelled through an outlet 344. The outlet 344 is bounded by the outer integral shroud 330, the plurality of blades 350, and a floor 360.

The second embodiment of the two-piece shrouded impeller 300 provides three general areas for attaching the annular shroud section 310 to the one-piece partially shrouded impeller 320: first at the annular shroud section rim 314, second at the annular shroud section inner edge 315, and third at the annular shroud section inner surface 316, which attaches to the plurality of blades 350.

In an alternative embodiment, one-piece partially shrouded impeller 320 may instead be manufactured from two or more assembled pieces. For example, the hub 322 may be manufactured separately from the section including inner integral shroud 370 and outer integral shroud 330. In such an example, the hub 322 could be attached to the plurality of blades 350 during assembly after manufacture of the individual pieces.

Figure 4:
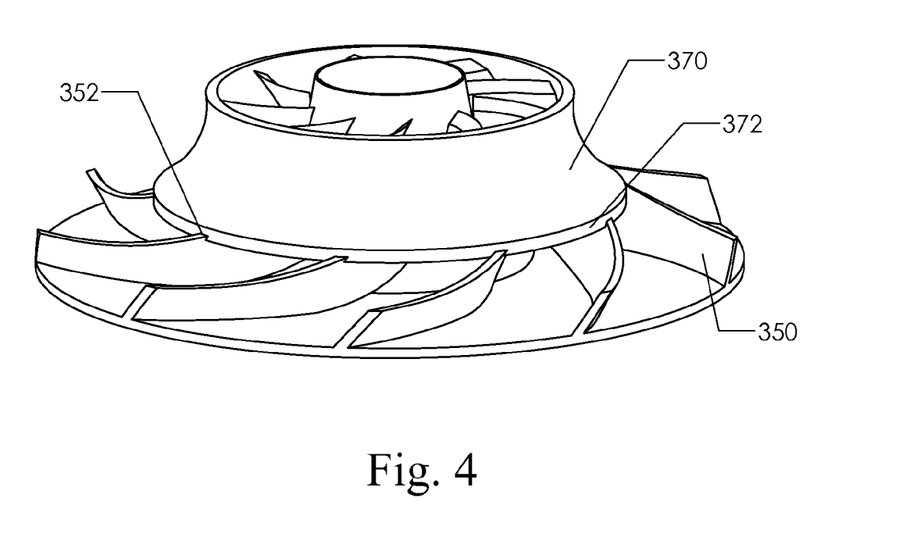
FIG. 4 is a detail of one portion of the second embodiment of a two-piece shrouded impeller.

FIG. 4 shows a detail of the one-piece partially shrouded impeller 320 (FIG. 3.) of the second embodiment. The outer integral shroud 330 is not shown in this detail to provide a better view of the plurality of blades 350. The plurality of blades 350 have axial extensions 352 which raise the plurality of blades 350 above the lower edge of inner integral shroud rim 372. The plurality of blade axial extensions 352 are inserted into a plurality of annular shroud section grooves 312 (FIG. 3). This connection may provide strength and accuracy to the two-piece shrouded impeller 300 (FIG. 3) by preventing rotation of the annular shroud section 310 (FIG. 3) in relation to the one-piece partially shrouded impeller 320 (FIG. 3).

In an alternative embodiment, annular shroud section grooves 312 (FIG. 3) may not be cut into the annular shroud section inner surface 316 (FIG. 3), and instead the annular shroud section inner surface 316 (FIG. 3) may rest directly on the plurality of blades 350, and the plurality of blades 350 may not have axial extensions 352.

The plurality of blades 350 may be bonded to the annular shroud section inner surface 316 using one of several, but not limited to techniques, for example, brazing, stick welding, ultra sonic welding (US welding), ultra violet welding (UV welding), electron beam welding (EBW), and other techniques. Unlike some other welding techniques, EBW does not add additional material during the welding process. Instead of adding material, EBW melts and mixes the materials of the two surfaces being joined.

Figure 5A:
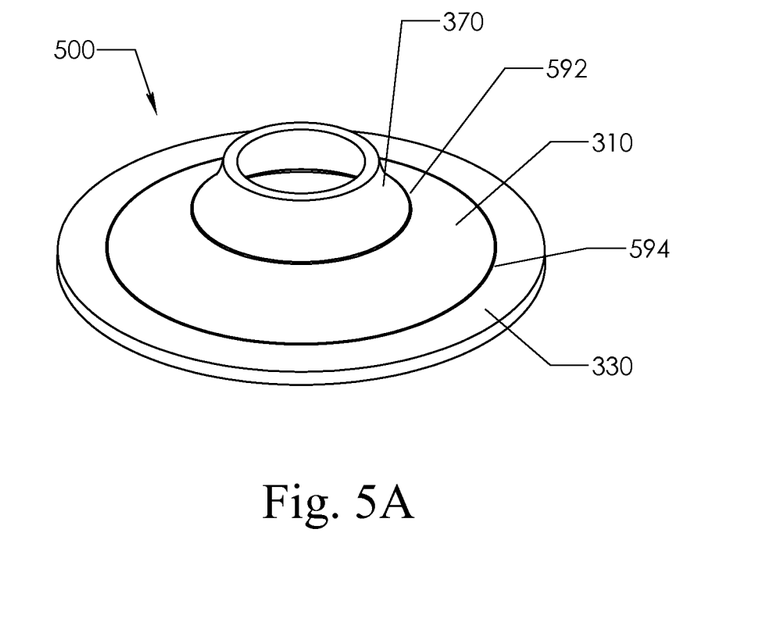
FIG. 5a is a view showing the assembled shroud portion of the second embodiment.
Figure 5B:
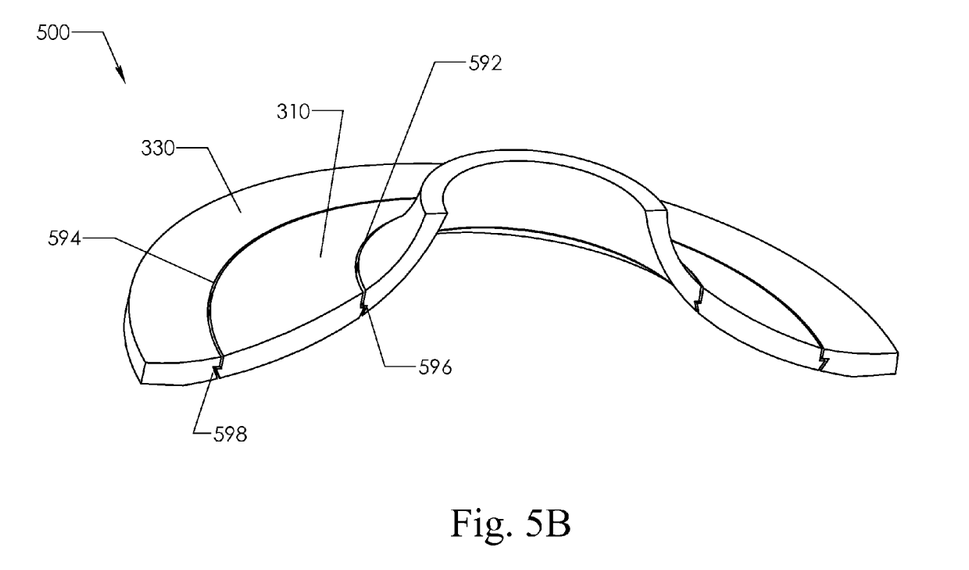
FIG. 5b is a section view showing the assembled shroud portion of the second embodiment.

FIG. 5A shows a detail of an assembled shroud 500 of the second embodiment with the hub 324 (FIG. 3) and the plurality of blades 350 (FIG. 3) omitted for clarity. FIG. 5B further shows a cutaway section of the assembled shroud 500.

As assembled, an inner exterior seam 592 and an inner interior seam 596 are formed where the annular shroud section rim 314 (FIG. 3) abuts the outer integral shroud inner edge 332 (FIG. 3). Similarly, when assembled, an outer exterior seam 594 and an outer interior seam 598 are formed where the annular shroud section inner edge 315 (FIG. 3) is adjacent to the inner integral shroud rim 372 (FIG. 3).

Figure 6:
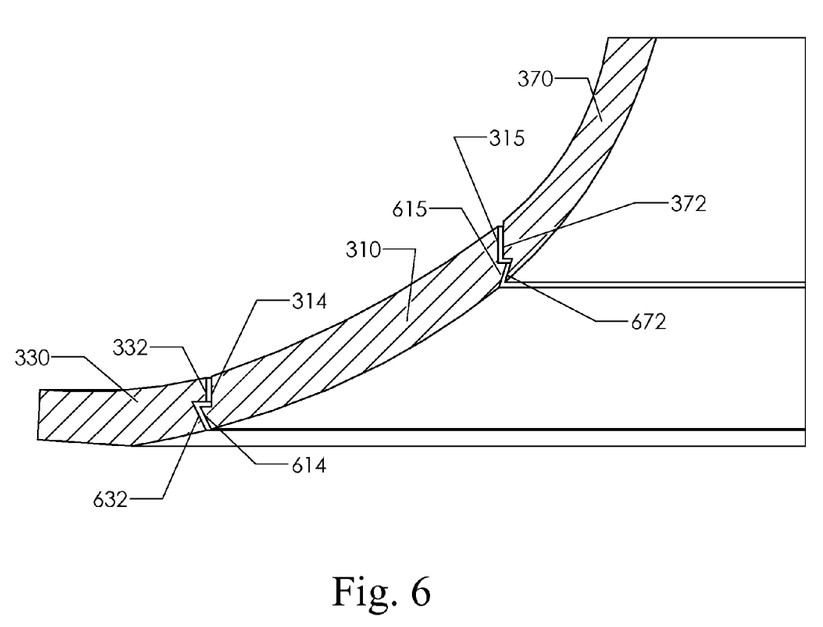
FIG. 6 shows a cutaway view of the shroud section attachment points of the second embodiment.

The annular shroud section 310 may be attached to the outer integral shroud 330 using several connection techniques. FIG. 6. shows a cutaway view of the assembled shroud 500 of the second embodiment. In this embodiment, the annular shroud section 310 is attached to the outer integral shroud 330 with an annular snap joint (ASJ). The ASJ is formed from protruding lip elements that snap into receiving slots as described below.

In this embodiment, the annular shroud section rim 314 is fashioned with an outer protruding lip 614, and the outer integral shroud inner edge 332 is fashioned with an outer receiving slot 632. When assembled, as shown in FIG. 6, the outer protruding lip 614 fits into the outer receiving slot 632, attaching the annular shroud section 310 to the outer integral shroud 330. The blades bound the annular shroud section from below.

Similarly, in this embodiment, the annular shroud section 310 is also attached to the inner integral shroud 370 with an ASJ. In this embodiment, the annular shroud section inner edge 315 is fashioned with an inner protruding lip 615, and the inner integral shroud rim 372 is fashioned with an inner receiving slot 672. When assembled, as shown in FIG. 6, the inner protruding lip 615 fits into the inner receiving slot 672, attaching the annular shroud section 310 to the inner integral shroud 370.

It should be noted that in alternative embodiments of an ASJ (not shown), the outer protruding lip 614 may instead be fashioned on the integral shroud inner edge 332 rather than on the annular shroud section rim 314, and the outer receiving slot 632 may likewise instead be fashioned on the annular shroud section rim 314 instead of on the outer integral shroud inner edge 332. Similarly, in alternative embodiments of an ASJ, the inner receiving slot 672 may instead be fashioned on the annular shroud section rim 315 rather than on the outer receiving slot 632, and the inner protruding lip 615 may likewise instead be fashioned on the inner integral shroud rim 372 instead of on the annular shroud section inner edge 315.

As depicted in FIG. 6, the outer protruding lip 614 has a triangular, sawtooth shape. In alternative embodiments, the outer protruding lip 614 may have other shapes, for example, a U-shaped bead having rounded edges, or a rectangular bead having squared edges. In these examples, the outer receiving slot 632 may be reciprocally shaped to receive the inner protruding lip 614. Similarly, different shapes may be used for inner protruding lip 615 and inner receiving slot 672.

Figure 7:
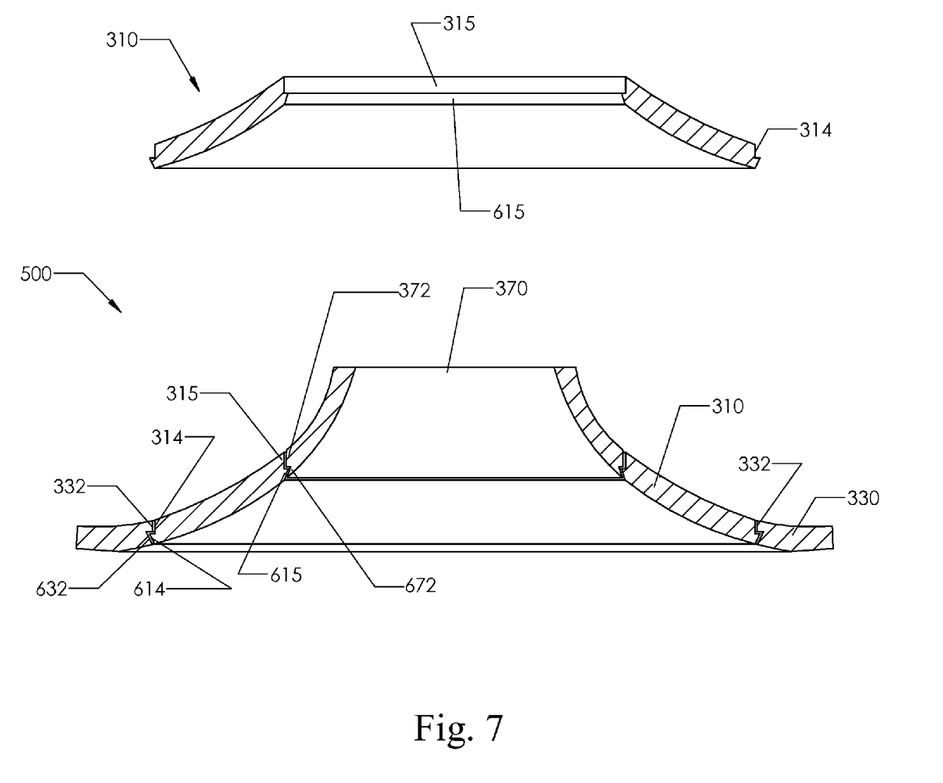
FIG. 7 shows an example of a method for assembling sections of a partial shroud of the second embodiment.

FIG. 7 depicts a detail of the second embodiment of assembled shroud 500 (FIG. 5A). FIG. 7 shows two instances of annular shroud section 310: first unassembled and second after being snapped into place in the annulus 380 (FIG. 3) between the inner integral shroud 370 and the outer integral shroud 330. During assembly, the annular shroud section 310 is pressed into the annulus 380 (FIG. 3). As the inner protruding lip 615 is slid past the inner receiving slot 672, a compressing force may be exerted upon the annular shroud section 310 by the inner integral shroud rim 372, which may cause the annular shroud section 310 to yield slightly until the inner protruding lip 615 slides past the inner integral shroud rim 372 and engages into the inner receiving slot 672, whereupon the compressing force on the annular shroud section 310 is released and the annular shroud section 310 rebounds to its previous shape. The annular shroud section 310 may similarly compress temporarily at the outer edge as the outer protruding lip 614 slides past the annular shroud section rim 314 before engaging with the outer receiving slot 632.

Alternative embodiments, otherwise consistent with the second embodiment described above, may employ methods other than an ASJ for attaching the annular shroud section 310 to the outer integral shroud 330 and the inner integral shroud 370. For example, the attachment may be made using a squeeze deformable ring (not shown). Such a mechanism may employ two removable compression rings attached to the annular shroud section 310. An inner compression ring would be formed as an extension of annular shroud section inner edge 315 and an outer compression ring would be formed as an extension of annular shroud section rim 314. As force is applied to press the outer compression ring toward the inner compression ring, the annular shroud section 310 is slightly deformed and compressed. While this force is applied to the compression rings, the annular shroud section 310 may be pressed into the annulus 380 (FIG. 3), allowing the outer protruding lip 614 to slide past the outer integral shroud inner edge 332, and similarly allowing inner protruding lip 615 to slide past inner integral shroud rim 372. Thereupon the force on the compression rings is released, allowing the annular shroud section 310 to spring back to its previous form, so that the outer protruding lip 614 is inserted into the outer receiving slot 632 and the inner protruding lip 615 is inserted into the inner receiving slot 672. After the annular shroud section 310 has been inserted into the annulus 380 (FIG. 3) the inner compression ring and the outer compression ring may be removed by milling or other means.

Another example of a method for attaching the annular shroud section 310 to the outer integral shroud 330 and the inner integral shroud 370 is by using an interference fit. In one example of an interference fit (not shown), the annular shroud section rim 314 and the outer integral shroud inner edge 332 are formed without protrusions such as the outer protruding lip 614, and without indentations such as the outer receiving slot 632. Instead of relying on protrusions snapping into indentations, the annular shroud section 310 is formed to fit tightly into the annulus 380. When the annular shroud section 310 is pressed into annulus 380, the friction of the annular shroud section rim 314 against the outer integral shroud inner edge 332 holds the annular shroud section 310 in place. Similarly, an interference fit may be used to secure the annular shroud section inner edge 315 to the inner integral shroud rim 372.

Other methods of attaching the annular shroud section 310 to the one-piece partially shrouded impeller 320 are possible, and the example attachment methods presented herein should not be interpreted as limitations upon such attachment methods.

Once the annular shroud section 310 has been fitted into annulus 380 as described above, it may be further secured by bonding the annular shroud section 310 to the one piece partially shrouded impeller 320 (FIG. 3) using one of several techniques. Examples of such bonding techniques, but not limited to include, brazing, stick welding, ultra sonic welding (US welding), UV welding, electron beam welding (EBW), and other techniques. As mentioned previously, EBW does not add additional material during the welding process. Instead of adding material, EBW melts and mixes the materials of the two surfaces being joined. Because EBW does not add material, there may not be a need to chamfer the edges where the surfaces are being joined, in contrast to techniques that add material during welding. The additional material used in other such welding techniques may add a bead along the connecting edge and thereby impede flow through the impeller.

Different bonding techniques may be used with the different attachment joints discussed above. An interference fit secured with EBW may provide advantageous flow characteristics. In contrast, an ASJ sealed by brazing or other methods that add material to the joint may have less desirable flow characteristics. Note that while EWB may be more expensive than other bonding techniques discussed, the cost may be offset by the savings of manufacturing a two-piece shrouded impeller 300 (FIG. 3) over the tooling costs and manufacturing time required to manufacture a one piece shrouded impeller.

Figure 8:
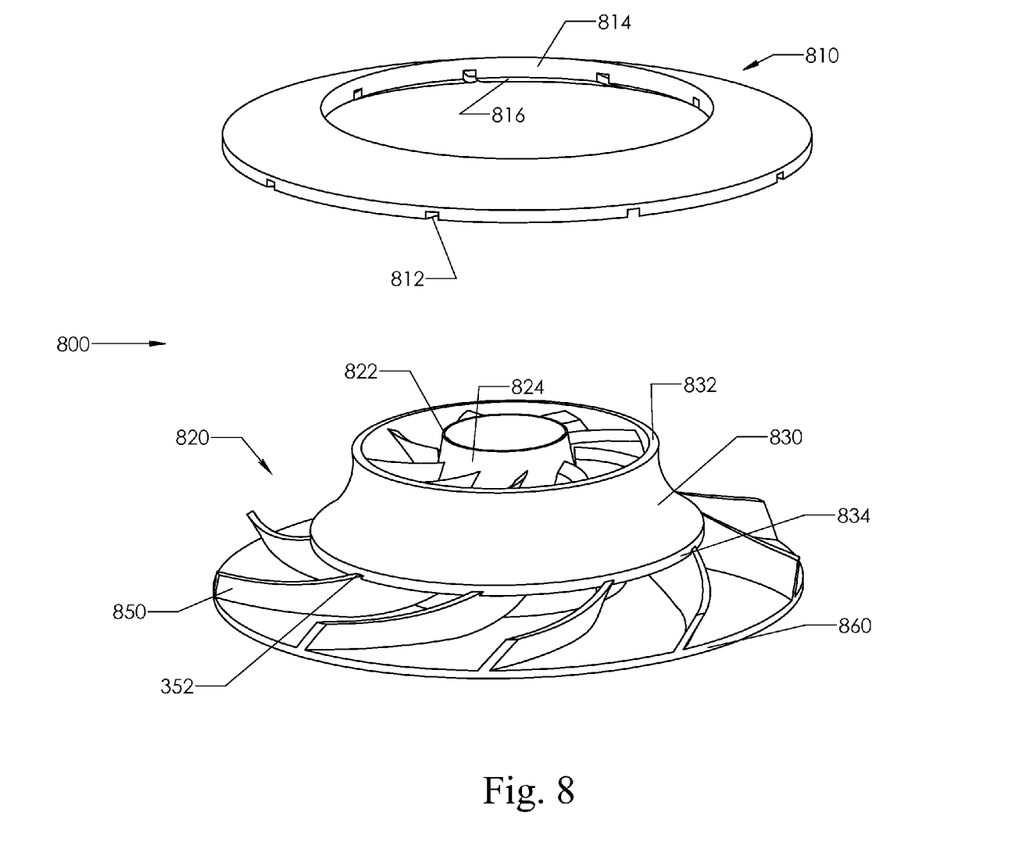
FIG. 8 is a diagram of a third embodiment of a two-piece shrouded impeller in exploded form.

FIG. 8 depicts an exploded view of a third embodiment of a two-piece shrouded impeller 800. The first piece of the two-piece shrouded impeller 800 is a one-piece "shrouded center" partially shrouded impeller 820. The second piece of the two-piece shrouded impeller 800 is an outer ring shroud 810. The one-piece shrouded center partially shrouded impeller 820 has a hub 822, an integral partial shroud 830, and a plurality of blades 850. The hub 822 is formed around a bore 824, allowing the hub 822 to be attached to a shaft (not shown) passing through the bore 824. The plurality of blades 850 are integrally attached to the hub 822 and are also integrally attached to the integral partial shroud 830. The integral partial shroud 830 partially covers the plurality of blades 850 under a partial shroud surface spanning from an inner edge 832 of integral partial shroud 830 to an outer rim 834 of integral partial shroud 830.

The outer ring shroud 810 is manufactured separately from the one-piece shrouded center partially shrouded impeller 820. When assembled, the outer ring shroud 810 attaches to the one-piece shrouded center partially shrouded impeller 820, further enclosing the plurality of blades 850. The plurality of grooves 812 correspond to the plurality of blades 850, so that the plurality of blades 850 fit into the plurality of grooves 812 when the outer ring shroud 810 and the one-piece shrouded center partially shrouded impeller 820 are assembled. When assembled, a connecting edge 814 of the outer ring shroud 810 is adjacent to an outer rim 834 of integral partial shroud 830, forming a seam 890 as shown in FIG. 9.

Figure 9:
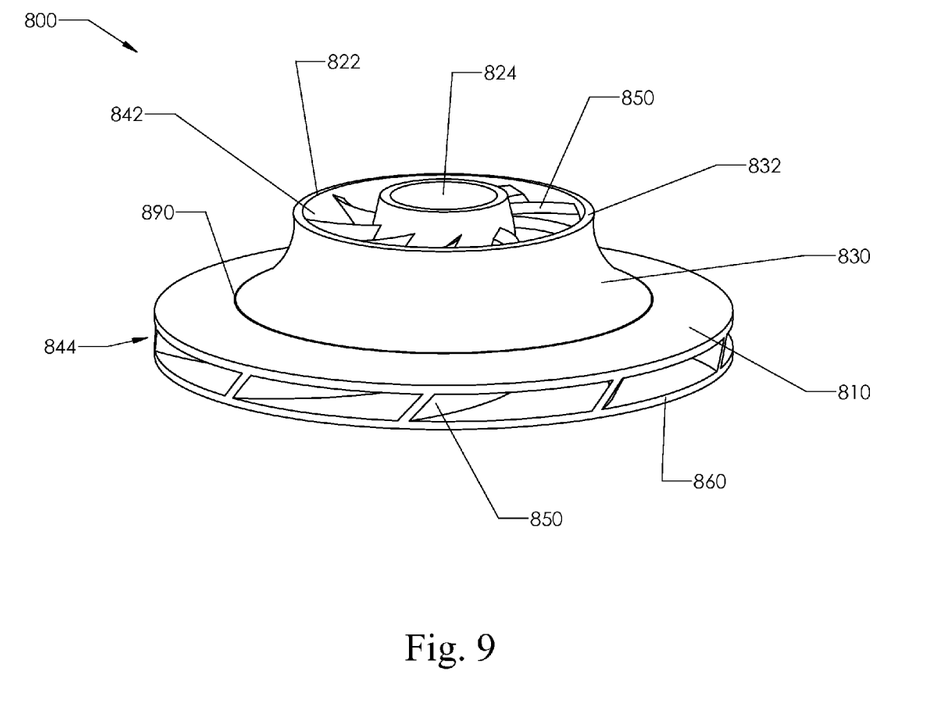
FIG. 9 is a second view of the third embodiment of the two-piece shrouded impeller as assembled.

FIG. 9 depicts a second view of the third embodiment of the two-piece shrouded impeller 800 where the outer ring shroud 810 and the one-piece shrouded center partially shrouded impeller 820 (FIG. 8) are assembled. When assembled, the two-piece shrouded impeller 800 rotates around a shaft (not shown) passing through the bore 824. Fluid enters the two-piece shrouded impeller 800 through an inlet 842, is impelled by the plurality of blades 850, passing between the hub 822 and the integral partial shroud 830 and the outer ring shroud 810, and exits through an outlet 844. The outlet 844 is bounded by the outer ring shroud 810, the plurality of blades 850, and a floor 860.

The outer ring shroud 810 may be attached to the one piece shrouded center partially shrouded impeller 820 by the attachment methods discussed previously, for example, a snap joint, a squeeze deformable ring, or an interference fit. In this third embodiment, a plurality of grooves 812 (FIG. 8) are formed into an inner surface 816 (FIG. 8) of the outer ring shroud 810. When assembled, the plurality of blades 850 are inserted into the plurality of grooves 812 (FIG. 8). Once outer ring shroud 810 is attached to the one piece shrouded center partially shrouded impeller 820 (FIG. 8), outer ring shroud 810 and one piece shrouded center partially shrouded impeller 820 (FIG. 8) may be bonded together by using one of the bonding techniques described previously, including brazing, stick welding, US welding, UV welding, EBW, and other techniques. Other variations to the third embodiment are possible within the scope of the embodiment, for instance, inner surface 816 of outer ring shroud 810 may be implemented without a plurality of grooves 812, and instead the plurality of blades 850 are bonded directly to the inner surface 816.

Figure 10:
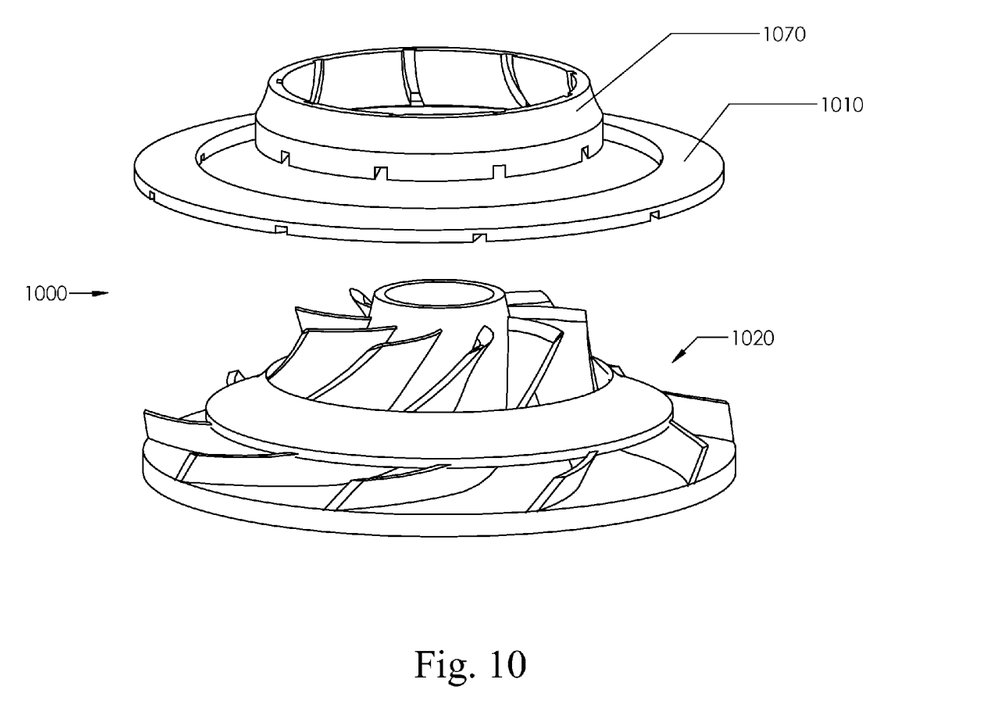
FIG. 10 is a diagram of an embodiment of a three-piece shrouded impeller in exploded form.

Additional embodiments are also possible. For example, FIG. 10 shows an exploded view of a three-piece shrouded impeller 1000. The first piece of the three-piece shrouded impeller 1000 is a one-piece middle ring partially shrouded impeller 1020. The second piece of the three-piece shrouded impeller 1000 is an outer ring shroud section 1010, and the third piece is an inner ring shroud section 1070. The outer ring shroud section 1010 is attached to the one-piece middle ring partially shrouded impeller 1020 using attachment methods described previously. Similarly, the inner ring shroud section 1070 is attached to the one-piece middle ring partially shrouded impeller 1020 using attachment methods described previously.

It will be apparent to those skilled in the art that various modifications and variations can be made to the structure and steps of the present invention without departing from the scope or spirit of the invention. In view of the foregoing, it is intended that the present invention cover modifications and variations of this invention provided they fall within the scope of the following claims and their equivalents.

What is claimed is:

1. A method for manufacturing a shrouded impeller, comprising the steps of:
    forming a one-piece partially shrouded impeller, said one-piece partially shrouded impeller comprising
        a centrally located hub formed around a center bore, said hub having a hub bore edge with a hub bore edge radius and a hub rim with a hub rim radius,
        a plurality of blades integrally attached to said hub,
        an integral partial shroud integrally attached to said plurality of blades, said integral partial shroud comprising an outer rim with an outer rim radius, and an inner edge with an inner edge radius, said integral partial shroud inner edge radius being smaller than said integral partial shroud outer rim radius;
    forming an inner shroud section comprising
        an inner shroud section inner surface configured to abut said plurality of blades,
        an inner shroud section connecting outer edge configured to abut said integral partial shroud inner edge; and
    forming an outer shroud section comprising
        an outer shroud section inner surface configured to abut said plurality of blades,
        an outer shroud section connecting inner edge configured to abut said integral partial shroud outer rim,
    wherein said inner shroud section and said outer shroud section are configured to join said integral partial shroud as a substantially contiguous shroud.

2. The method of claim 1, wherein said forming comprises milling.

3. The method of claim 1, wherein said forming comprises selective laser sintering (SLS).

4. The method of claim 1, wherein said forming comprises stereolithography.

5. The method of claim 1, wherein:
    said inner shroud section and/or said outer shroud section further comprises a plurality of grooves formed in said inner shroud section and/or said outer shroud section inner surface, said plurality of grooves configured to receive a plurality of blade axial extensions raising surfaces of each of said plurality of blades.

6. The method of claim 5, further comprising the steps of:
    attaching said inner shroud section and said outer shroud section to said partially shrouded impeller; and
    bonding said inner shroud section and said outer shroud section to said partially shrouded impeller.

7. The method of claim 6, wherein attaching comprises a snap joint.

8. The method of claim 6, wherein attaching comprises an interference fit.

9. The method of claim 6, wherein attaching comprises a squeeze deformable ring.

10. The method of claim 6, wherein bonding comprises brazing.

11. The method of claim 6, wherein bonding comprises stick welding.

12. The method of claim 6, wherein bonding comprises ultra sonic welding.

13. The method of claim 6, wherein bonding comprises electron beam welding.

14. A shrouded impeller, comprising:
    a one-piece partially shrouded impeller, said one-piece partially shrouded impeller comprising
        a centrally located hub formed around a center bore, said hub having a hub bore edge with at hub bore edge radius and a hub rim with a hub rim radius,
        a plurality of blades integrally attached to said hub,
        an integral partial shroud integrally attached to said plurality of blades, said integral partial shroud comprising an outer rim with an outer rim radius, said integral partial shroud further comprising an inner edge with an inner edge radius, said integral partial shroud inner edge radius being smaller than said integral partial shroud outer rim radius;
    an inner shroud section comprising
        a shroud section inner surface configured to abut said plurality of blades,
        an inner shroud section connecting outer edge configured to abut said integral partial shroud inner edge; and
    an outer shroud section comprising
        an outer shroud section inner surface configured to abut said plurality of blades,
        an outer shroud section connecting inner edge configured to abut said integral partial shroud outer rim,
    wherein said inner shroud section and said outer shroud section are configured to join said integral partial shroud as a substantially contiguous shroud.

15. The shrouded impeller of claim 14, wherein said inner shroud section and said outer shroud section comprises 10% to 90% of the area of said substantially contiguous shroud.

16. The shrouded impeller of claim 14, further comprising:
    a plurality of grooves formed in said inner shroud section and said outer shroud section inner surface, said plurality of grooves configured to receive a plurality of blade axial extensions.

17. The shrouded impeller of claim 14, wherein:
    said inner shroud section is attached to said integral partial shroud by a snap joint; and
    said outer shroud section is attached to said integral partial shroud by a snap joint.

18. The shrouded impeller of claim 14, wherein:
    said inner shroud section is attached to said integral partial shroud by interference fit; and
    said outer shroud section is attached to said integral partial shroud by interference fit.

19. The shrouded impeller of claim 14, wherein:
said inner shroud section is attached to said integral partial shroud by a squeeze deformable ring; and
said outer shroud section is attached to said integral partial shroud by a squeeze deformable ring.

20. The shrouded impeller of claim 14, wherein:
said inner shroud section and said outer shroud section inner surface is bonded to said plurality of blades by brazing;
said inner shroud section and said outer shroud section is bonded to said integral partial shroud by brazing; and
said inner shroud section and said outer shroud section is bonded to said integral partial shroud by brazing.

21. The shrouded impeller of claim 14, wherein:
said inner shroud section and said outer shroud section inner surface is bonded to said plurality of blades by stick welding;
said inner shroud section and said outer shroud section is bonded to said integral partial shroud by stick welding; and
said inner shroud section and said outer shroud section is bonded to said integral partial shroud by stick welding.

22. The shrouded impeller of claim 14, wherein:
said inner shroud section and said outer shroud section inner surface is bonded to said plurality of blades by ultra sonic welding;
said inner shroud section and said outer shroud section is bonded to said integral partial shroud by ultra sonic welding; and
said inner shroud section and said outer shroud section is bonded to said integral partial shroud by ultra sonic welding.

23. The shrouded impeller of claim 14, wherein:
said inner shroud section and said outer shroud section inner surface is bonded to said plurality of blades by electron beam welding;
said inner shroud section and said outer shroud section is bonded to said integral partial shroud by electron beam welding; and
said inner shroud section and said outer shroud section is bonded to said integral partial shroud by electron beam welding.

\* \* \* \* \*